US007825938B2

(12) United States Patent
Chen

(10) Patent No.: US 7,825,938 B2
(45) Date of Patent: Nov. 2, 2010

(54) METHOD AND APPARATUS FOR PROCESSING DIGITAL IMAGE TO BE DISPLAYED ON DISPLAY DEVICE WITH BACKLIGHT MODULE

(75) Inventor: Shing-Chia Chen, Sinshih Township (TW)

(73) Assignee: Himax Technologies Limited, Tainan County (TW)

( * ) Notice: Subject to any disclaimer, the term of this patent is extended or adjusted under 35 U.S.C. 154(b) by 595 days.

(21) Appl. No.: 11/850,820

(22) Filed: Sep. 6, 2007

(65) Prior Publication Data

US 2009/0066715 A1 Mar. 12, 2009

(51) Int. Cl.
*G09G 5/02* (2006.01)
*G09G 5/10* (2006.01)
*G09G 3/36* (2006.01)
*G06K 9/00* (2006.01)
*G06K 9/38* (2006.01)
*G06K 9/40* (2006.01)
*G06T 5/40* (2006.01)
*G09G 3/34* (2006.01)

(52) U.S. Cl. ....................... 345/589; 345/102; 345/426; 345/207; 345/690; 348/366; 348/602; 348/761; 358/509; 358/519; 358/522; 358/525; 349/1; 349/61; 382/169; 382/254; 382/274; 382/300

(58) Field of Classification Search ................. 345/589, 345/102, 426, 428, 581, 617, 616, 618, 204, 345/207, 690, 89, 77, 84, 63; 382/168-169, 382/172, 254, 274, 276, 299-300; 348/365-366, 348/368, 362, 602, 615, 673, 761; 358/509, 358/516
See application file for complete search history.

(56) References Cited

U.S. PATENT DOCUMENTS

| | | | | |
|---|---|---|---|---|
| 6,594,388 | B1 * | 7/2003 | Gindele et al. | 382/167 |
| 2003/0016949 | A1 * | 1/2003 | Unger | 386/94 |
| 2003/0202589 | A1 * | 10/2003 | Reitmeier et al. | 375/240.12 |
| 2005/0248592 | A1 * | 11/2005 | Feng et al. | 345/690 |
| 2007/0153117 | A1 * | 7/2007 | Lin et al. | 348/362 |
| 2007/0269132 | A1 * | 11/2007 | Duan et al. | 382/274 |
| 2007/0285382 | A1 * | 12/2007 | Feng | 345/102 |
| 2008/0238935 | A1 * | 10/2008 | Huang et al. | 345/617 |
| 2008/0297460 | A1 * | 12/2008 | Peng et al. | 345/102 |
| 2009/0060367 | A1 * | 3/2009 | Wei | 382/260 |
| 2009/0262067 | A1 * | 10/2009 | Feng et al. | 345/102 |

* cited by examiner

*Primary Examiner*—Wesner Sajous
(74) *Attorney, Agent, or Firm*—Stout, Uxa, Buyan & Mullins, LLP

(57) ABSTRACT

A method and apparatus for processing a digital image to be displayed on a display panel illuminated with a backlight module. The backlight module is set to a specific backlight duty according to a luminance statistic of the digital image. The digital image is remapped through a tone mapping function formed according to the specific backlight duty and the luminance statistic.

18 Claims, 4 Drawing Sheets

METHOD AND APPARATUS FOR PROCESSING DIGITAL IMAGE TO BE DISPLAYED ON DISPLAY DEVICE WITH BACKLIGHT MODULE

BACKGROUND OF THE INVENTION

1. Field of the Invention

The present invention generally relates to digital image processing, and more particularly to a method and apparatus for processing a digital image to be displayed on a display device with a backlight module.

2. Description of the Prior Art

For displaying an image on a display device illuminated with a backlight module, such as a liquid crystal display (LCD) panel, the duty (i.e., the illumination strength) of the backlight module is preferred to be adaptively adjusted according to the content to be displayed. One of the purposes is to provide just-fitting illumination for each image to be displayed so as to save electricity power. Accordingly, different images tend to be displayed with different backlight duties in a dynamically controlled backlight system.

With the same image, however, it usually leads to noticeable differences between the case with full duty backlight and the case with adaptively controlled backlight. Such noticeable differences typically arise from contrast loss due to a smaller backlight illumination. Bad visual experience is therefore likely to happen unless the problem is properly handled.

To overcome this problem, it may adjust the Gamma correction factor in the D/A module of the display device, so as to produce a visual effect close to that with full backlight duty. The effect, however, is limited especially for high luminance region of the image, which still suffers from pronounced loss of luminance or contrast.

It may also scale up the luminance of the image to be displayed before it is passed to the D/A module. With scaling up, it means luminance values of all pixels (picture elements) in the image are proportionally increased to compensate the loss of illumination due to dynamically controlled backlight. This produces an effective Gamma correction close to the full backlight duty case in a range broader than above method which adjusts the Gamma correction factor. This method, however, tends to cause saturation in high luminance portion of the image to be displayed. The dynamic range in a brighter scene is thus deteriorated.

In view of foregoing, it can be appreciated that a substantial need exists for methods and apparatus which can advantageously provide a solution to resolve the contrast loss problem such that the power saving adaptive backlight control mode can coexist with a pleasing visual experience.

SUMMARY OF THE INVENTION

It is therefore an object of the present invention to provide a digital image processing method to improve the contrast for the digital image to be displayed on a display panel illuminated with a dynamically controlled backlight module.

The present invention is also directed to an apparatus for implementing the contrast improving digital image processing method.

In a preferred embodiment, the present invention provides a method for processing a digital image which is to be displayed on a display panel illuminated with a backlight module. The method comprises generating a luminance statistic of the digital image; determining a specific backlight duty according to the luminance statistic; setting the backlight module to the specific backlight duty; forming a tone mapping function according to the specific backlight duty and the luminance statistic; and remapping the digital image by the tone mapping function before the digital image is displayed on the display panel.

The present invention also provides an apparatus for implementing above method. The apparatus comprises an image analysis unit configured for generating a luminance statistic of a digital image and determining a specific backlight duty according to the luminance statistic; a backlight setting unit capable of setting the backlight module to the specific backlight duty; a tone mapping function generator configured for forming a tone mapping function according to the specific backlight duty and the luminance statistic; and a tone remapping unit configured for remapping the digital image by the tone mapping function.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which.

DETAILED DESCRIPTION OF THE INVENTION

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention. Furthermore, in the following description as well as the language of claims, the asterisk sign "*" is used to represent a multiplying operation. The expression "**R1*X1", for example, means the product of the number R1 and the number X1**. Additionally, a linear mapping function represented by a straight line having a specific slope may be hereinafter alternatively referred to as the linear mapping function having the specific slope.

Figure 1:
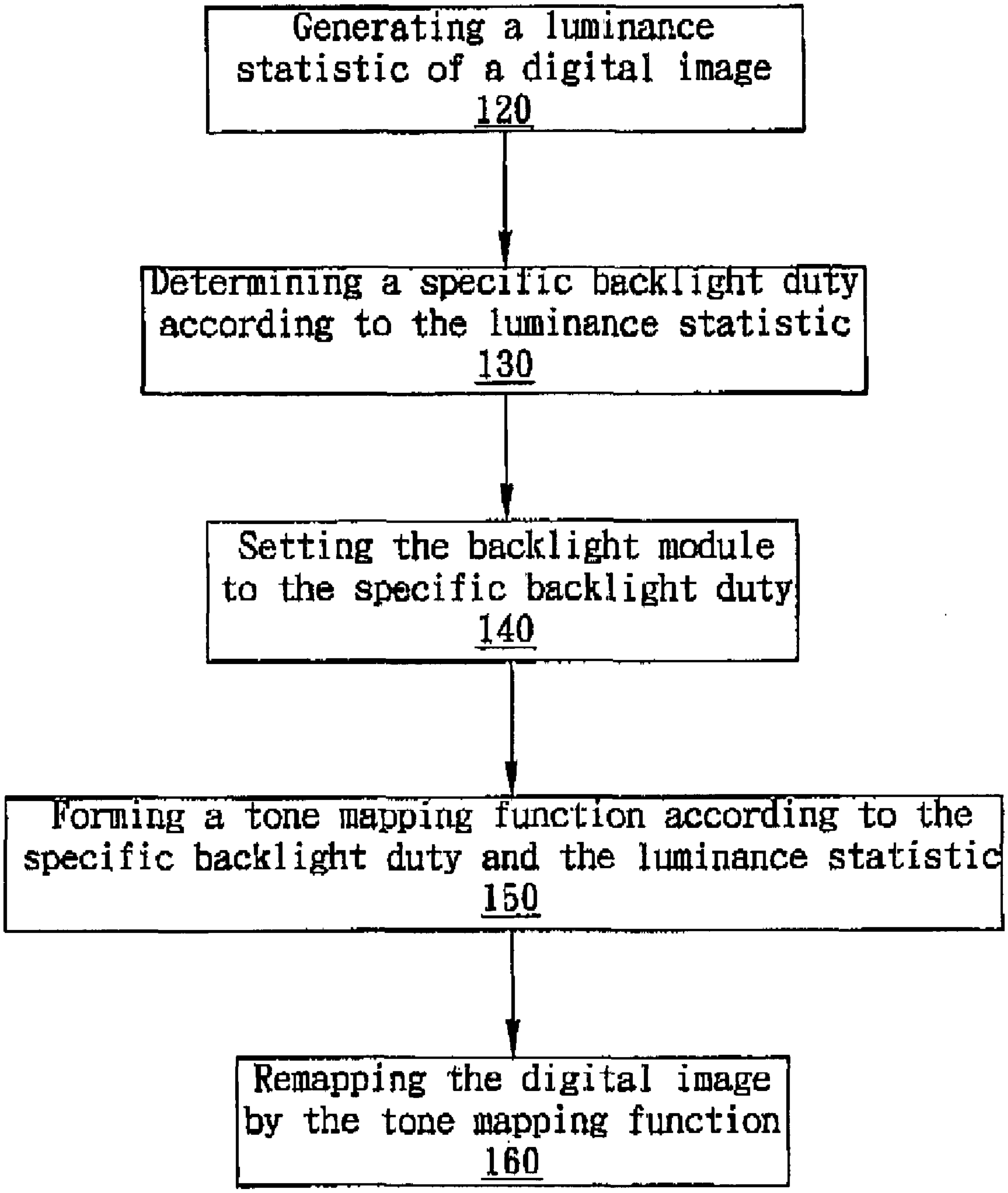
FIG. 1 illustrates a digital image processing method in accordance with an embodiment of the present invention.

FIG. 1 illustrates a digital image processing method in accordance with an embodiment of the present invention. The digital image processing method may be applied to process a digital image before the digital image is shown on a display device illuminated with a backlight module. For example, the display device may be a liquid crystal display (LCD) panel embedded with a backlight module. As described above, the duty of the backlight module is preferred to be adaptively adjusted according to the content to be displayed. The inventive digital image processing method in accordance with the present invention thus aims to analyze the digital image to provide information for backlight control as well as to perform necessary processing on the digital image before it is displayed on the display device.

The digital image may be a digital still image. Alternatively, the digital image may be an image frame within a video stream. Typically, the digital image may be an image frame decoded from a video stream compressed with a specific image compression standard. As should be appreciated, the digital image may be represented as an array of pixels, in which each pixel contains one or more numerical components that define optical characteristic of the pixel, such as luminance and/or chroma information.

The luminance components of all pixels in the received digital image are extracted in step 120 to generate a luminance statistic generally referred to as a histogram. The histogram of a digital image records occurrence frequencies of all possible luminance values of pixels in the digital image. The received digital image may be either a monochrome image or a color image. For the monochrome case, the gray levels of pixels are themselves used as the luminance components. For the color case, each pixel of the received digital image contains numerical components that define a color. Three components, or primary colors, are necessary and sufficient for this purpose in various color spaces. In RGB color space, for example, these primary colors are red, green and blue, and the luminance component of each pixel can be obtained by a weighted summing of the red, green, and blue components of the pixel data (e.g., 0.33R+0.57G+0.11B). Depending on the bit resolution (i.e. number of bits representing respective component, typically identical for all three components in a digital color image) used to encode the digital image, the maximum code value of the derived luminance may be different. When the bit resolution is 8 (8 bits respectively used to encode each color and the derived luminance), for example, the possible code value for the luminance will generally range from 0 to 255 ($2^8$-1), and the maximum code value is 255. In this case, the histogram generated will contain count of pixels for each code value lying between 0 and 255. The maximum code value in the predetermined bit resolution of the received digital image will be denoted as Cmax hereinafter.

In another embodiment in accordance with the present invention, the luminance statistic generated in step 120 may be simply the average luminance value of all pixels in the received digital image.

According to the histogram generated in step 120, a specific backlight duty is determined in step 130. The specific backlight duty may be represented as a percentage (such as 90%, 80%, 75%, etc) to the full duty (i.e., the maximum strength) of the backlight module. For example, when it is determined to set the backlight module to its maximum duty, then the specific backlight duty is determined to be 100%. Based on experiences or experiments, various criteria may be employed to determine the specific backlight duty from a luminance characteristic (which in turn may be derived from the histogram) of the received digital image. Basically, a smaller backlight duty is used for a darker image.

In step 140, the backlight module is then set to the specific backlight duty through, for example, a backlight controller. As should be appreciated by those skilled in the art, the backlight controller may be driven by a PWM (pulse width modulation) signal or any other feasible signal. Buy controlling the active duty of the PWM signal, for example, the illumination of the backlight module can be adjusted.

The generated histogram may be different for different received digital images, and the backlight duty applied to the backlight module may be different dependent on the content of the digital images to be displayed, which therefore attains the object of content-adaptive backlight control.

To create an output image that is more pleasing to a general viewer, the digital image processing method according to the present invention remaps the received digital image before it is shown on the display panel such as the LCD panel. Step 150 forms a tone mapping function T(x) based on the luminance statistic and the specific backlight duty determined above. In step 160, the received digital image is then remapped by the tone mapping function T(x) constructed in step 150 before it is finally displayed.

Note that the steps described above are not necessarily executed in the order shown in FIG. 1. The step for controlling the backlight module (e.g. step 140), for example, may be executed after or concurrently with the step for forming the tone mapping function (e.g. step 150). In general, a number of steps may be synchronized by a timing mechanism specifically designed in the system involving the disclosed method.

Figure 2:
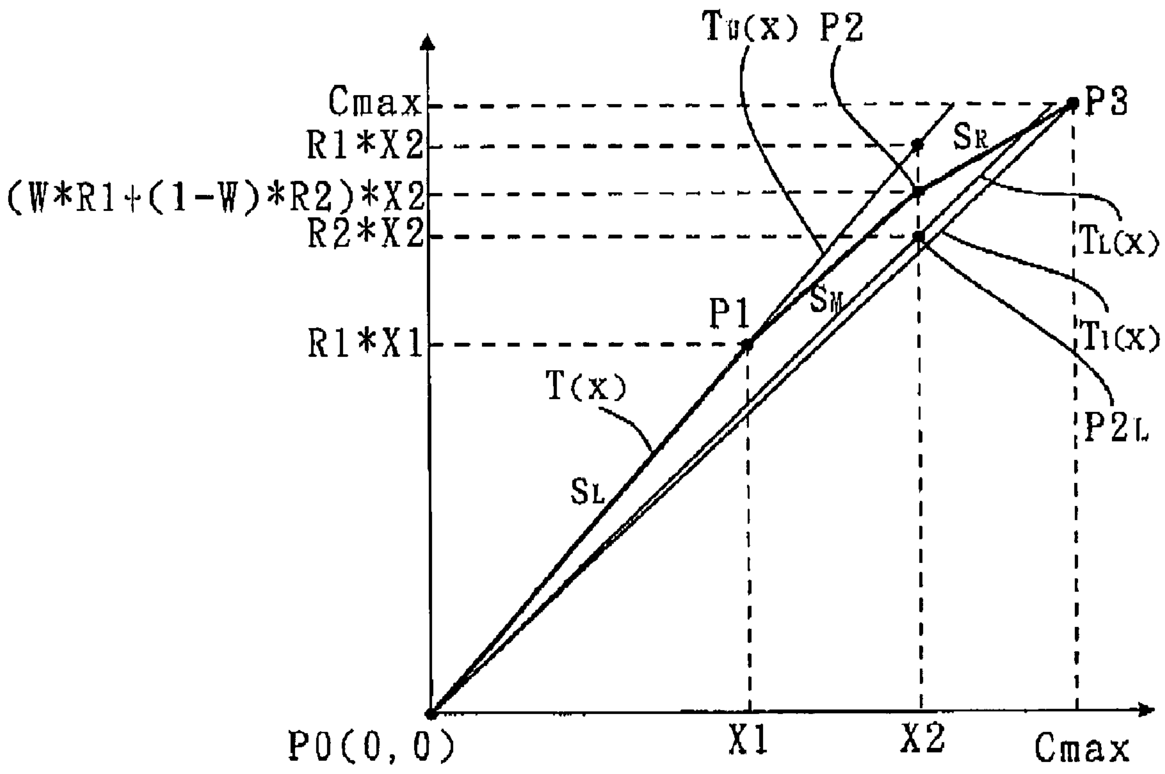
FIG. 2 shows a graphic diagram for illustrating the characteristic of the tone mapping function T(x) mentioned in the description of FIG. 1 in accordance with an embodiment of the present invention.

FIG. 2 shows a graphic diagram for illustrating the characteristic of the tone mapping function T(x) mentioned in the description of FIG. 1 in accordance with an embodiment of the present invention. As shown in FIG. 2, the newly generated tone mapping function T(x) is shown as the thicker solid line segments lying between an upper limit mapping function $T_U(x)$ and a lower limit mapping function $T_L(x)$. The upper limit mapping function $T_U(x)$ is represented by a straight line having a specific slope R1, as can be noted by the point P1(X1,R1*X1) lying thereon. By using the convention mentioned above, the upper limit mapping function $T_U(x)$ may be referred to as a linear mapping function having the specific slope R1. Likewise, the lower limit mapping function $T_L(x)$ is a linear mapping function having a specific slope R2, as can be noted by the point P2$_L$(X2,R2*X2) lying thereon. Also shown in FIG. 2 is the unity mapping function $T_1(x)$ which remaps each input value to itself, in other words, the transfer "curve" representing the unity mapping function $T_1(x)$ is a straight line having a slope equal to one.

The code values X1 and X2 are respectively referred as the first and second luminance values which are determined according to the specific slope R1 of $T_U(x)$. Please refer to the description of FIG. 3 for further detail on the principles for determining the specific luminance values X1 and X2.

As can be noted in FIG. 2, the transfer "curve" representing the tone mapping function T(x) is composed of three line segments, i.e., the leftmost line segment $S_L$, the middle line segment $S_M$ and the rightmost line segment $S_R$. Firstly, any luminance value less than the first luminance value X1 is remapped through the leftmost segment $S_L$ which overlaps the line standing for the upper limit mapping function $T_U(x)$. In other words, the tone mapping function T(x) will remap any luminance value less than the first luminance value X1 through the upper limit mapping function $T_U(x)$.

Moreover, the second luminance value X2 is remapped to a specific value (W*R1+(1−W)*R2)*X2, in which W is a weighting number lying between 0 and 1 which may be determined according to the generated histogram. Please refer to the description of FIG. 3 for further detail about the weighting number W. Note that the remapped value (W*R1+(1−W)*R2)*X2 is a value lying between R1*X2 (the remapped value of X2 through $T_U(x)$) and R2*X2 (the remapped value of X2 through $T_L(x)$), which means the newly formed tone mapping function T(x) remaps the second luminance value X2 to a value between the remapped values thereof through the upper limit mapping function $T_U(x)$ and the lower limit mapping function $T_L(x)$. Additionally, it is noted from FIG. 2 that the newly formed tone mapping function T(x) remaps the maximum code value Cmax to itself, i.e., Cmax.

It is also noted from FIG. 2 that any luminance value lying between the first luminance value X1 and the second luminance X2 is remapped through the middle segment $S_M$ which connects the two points P1(X1,R1*X1) and P2(X2,(W*R1+(1−W)*R2)*X2). In other words, the tone mapping function T(x) remaps any pixel with a luminance value lying between the first luminance value X1 and the second luminance X2 through a mapping function represented by the straight line connecting points P1(X1,R1*X1) and P2(X2,(W*R1+(1−W)*R2)*X2).

Finally, any luminance value greater than the second luminance X2 is remapped through the rightmost segment $S_R$ which is a line segment connecting the two points P2(X2,(W*R1+(1−W)*R2)*X2) and P3(Cmax, Cmax). Note that, as mentioned above, Cmax is the maximum code value that can be generated with current bit resolution for the luminance component. Likewise, this means that the tone mapping function T(x) remaps any luminance value greater than the second luminance X2 through another mapping function represented by the straight line connecting points P2(X2, (W*R1+(1−W)*R2)*X2) and P3(Cmax, Cmax).

The behavior of the tone mapping function T(x) has been completely defined by the three segments $S_L$, $S_M$ and $S_R$. Note that the tone mapping function T(x) may be changed for different received digital images. Since the backlight duty is adaptively adjusted, the tone mapping function T(x) is accordingly also adaptively changed so as to compensate potential contrast loss or luminance distortion resulted from the dynamically adjusted backlight strength.

Figure 3:
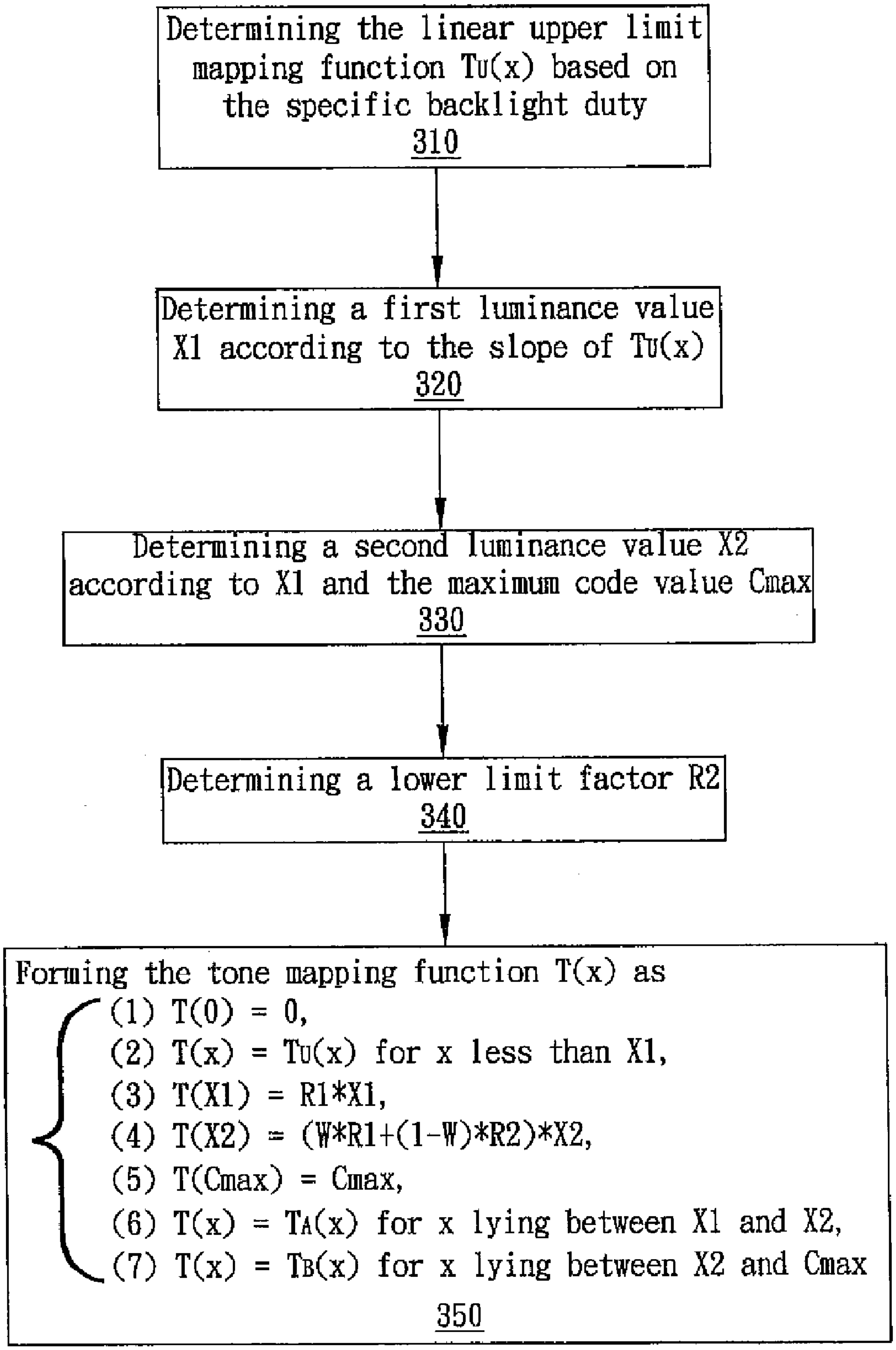
FIG. 3 further illustrates the detail of the tone mapping function forming step of FIG. 1 in accordance with an embodiment of the present invention.

FIG. 3 further illustrates the detail of the tone mapping function forming step of FIG. 1 in accordance with an embodiment of the present invention.

Step 310 determines the linear upper limit mapping function $T_U(x)$ based on the aforementioned specific backlight duty. Particularly, the specific slope R1 of the linear mapping function $T_U(x)$ may be derived from the specific backlight duty. For example, in the extreme case when the system Gamma correction factor of the display device is turned off (i.e., set to 1), the specific slope R1 of the linear upper limit mapping function $T_U(x)$ may be set to the reciprocal of the specific backlight duty so as to directly compensate resulted contrast loss. In general, the specific slope R1 of $T_U(x)$ increases when the specific backlight duty decreases. Due to various preferences of different potential viewers, the specific slope R1 of $T_U(x)$ may be determined empirically for different range of the specific backlight duty.

Step 320 determines the first luminance value X1 according to the specific slope R1. In this embodiment, a list of candidate luminance values, for example, {Cmax/2, Cmax/4, Cmax/8, . . . , 2}, is determined in advance. Then, from the list, the largest candidate value Cx with remapped value $T_U(Cx)$ less than Cmax will be selected as the first luminance value X1. For example, when the specific slope R1 is less than 2 (for most of the cases), then Cmax/2 is selected as the first luminance value X1.

The second luminance value X2 is determined in step 330. The second luminance value X2 may be selected from any suitable code value lying between the first luminance value X1 and the maximum code value Cmax. In a preferred embodiment, the second luminance value X2 is selected to be the code value lying exactly in the middle of the first luminance value X1 and the maximum code value Cmax, i.e., (Cmax+X1)/2.

Step 340 determines a lower limit factor to function as a lower bound of the remapped value of the second luminance value X2. The lower limit factor may be empirically determined to be a number slightly larger than or equal to one. The lower limit factor is the slope R2 of the lower limit mapping function $T_L(x)$ described in FIG. 2. In a preferred embodiment according to the present invention, the lower limit factor is selected to be one, in other words, the aforementioned lower limit mapping function $T_L(x)$ is selected to be the unity mapping function $T_1(x)$ having the unity slope.

In step 350, the desired tone mapping function T(x) is then defined as:

(1) T(0)=0, (2) T(x)=$T_U(x)$ for x less than X1, (3) T(X1)=R1*X1, (4) T(X2)=(W*R1+(1−W)*R2)*X2, (5) T(Cmax)=Cmax, (6) T(x)=$T_A(x)$ for x lying between X1 and X2, and (7) T(x)=$T_B(x)$, for x lying between X2 and Cmax, in which $T_A(X)$ is the mapping function represented by the straight line connecting the two points P1(X1,R1*X1) and P2(X2,(W*R1+(1−W)*R2)*X2), and $T_B(x)$ is the mapping function represented by the straight line connecting the two points P2(X2, (W*R1+(1−W)*R2)*X2) and P3(Cmax, Cmax). In contrast with FIG. 2, the items listed in (1) through (7) respectively correspond to the point P0, the line segment $S_L$, the point P1, the line segment $S_M$, the point P2, the line segment $S_R$ and the point P3 shown in FIG. 2.

In a preferred embodiment according to the present invention, based on the generated histogram, the weighting number W may be set to the value substantially equaling a ratio of count of pixels with luminance values lying between the first luminance value X1 and the second luminance value X2 to count of pixels with luminance values lying between the first luminance value X1 and the maximum code value Cmax in the received digital image.

Figure 4:
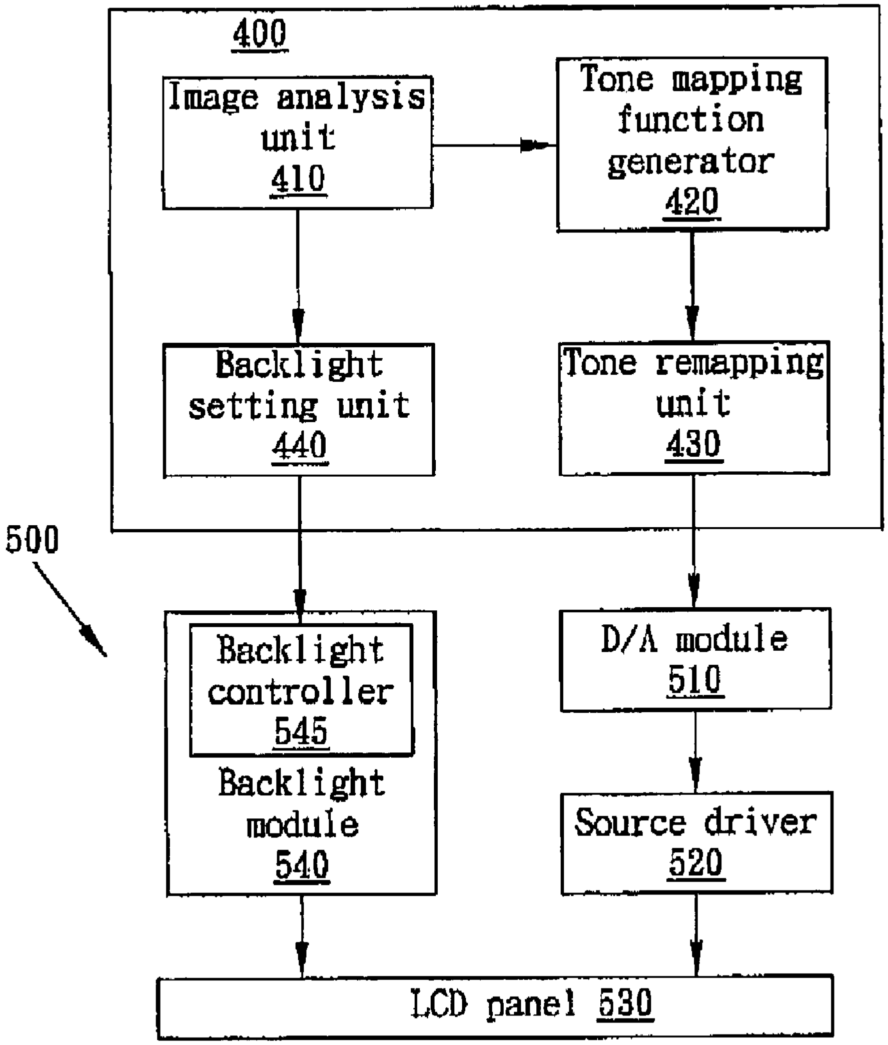
FIG. 4 shows the block diagram of a digital image processing apparatus in accordance with an embodiment of the present invention.

Referring to FIG. 4, which shows the block diagram of a digital image processing apparatus 400 in accordance with an embodiment of the present invention. The digital image processing apparatus 400 may be embedded in an image display system 500 such as an LCD. The digital image processing apparatus 400 includes an image analysis unit 410, a tone mapping function generator 420, a tone remapping unit 430 and a backlight setting unit 440. The image analysis unit 410 is communicated with the tone mapping function generator 420 which is communicated with the tone remapping unit 430. The image analysis unit 410 is also communicated with the backlight setting unit 440. For a unit A being communicated with another unit B, it means that the unit A is capable of communicating the unit B through suitable mechanism, such as, but not limit to, bus lines connected therebetween or a shared memory.

The tone remapping unit 430 may connect to a D/A module 510 responsible for the digital to analog converting related operations (e.g., the Gamma correction). The D/A module 510 may then connect to the source driver 520 of the LCD 500. Source driver 520 is typically connected to the LCD panel 530. On the other hand, the backlight setting unit 440 may connect to the backlight controller 545 embedded in the backlight module 540 which in turn is coupled to the LCD panel 530.

The image analysis unit 410 may perform the operations described in steps 120 and 130. Specifically, the image analysis unit 410 may be configured to extract desirable information from the received digital image to construct a luminance histogram, and then, based on the histogram, determine a specific backlight duty for the backlight module 540. Based on the specific backlight duty produced by the image analysis unit 410, the backlight setting module 440 may then set the backlight module 540 to the specific backlight duty. In a preferred embodiment, the digital image processing apparatus 400 is the digital video processing module of the LCD 500. To properly set the backlight module, all it needs to do may simply program some register(s) in the backlight controller 545. In another embodiment, the backlight setting module 440 may simply program some registers in a PWM generator configured to drive the backlight module 540.

The tone mapping function generator 420 is configured to execute the aforementioned step 150 so as to generate a tone mapping function T(x) based on the luminance statistic and the specific backlight duty determined above. The tone remapping unit 430 may execute step 160 to remap the received digital image by the tone mapping function T(x) constructed by the tone mapping function generator 420.

Figure 5:
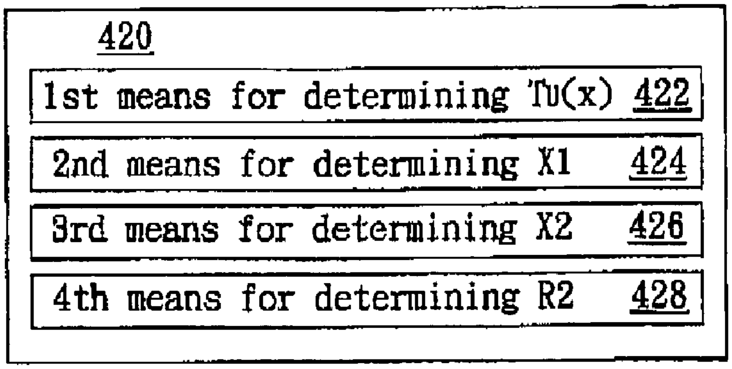
FIG. 5 shows the block diagram of the tone remapping unit described in FIG. 4.

FIG. 5 shows the block diagram of the tone mapping function generator 420. The tone mapping function generator 420 may include a first means 422, a second means 424, a third means 426 and a fourth means 428. The first means 422 may be configured for performing step 310 to determine the linear upper limit mapping function $T_U(x)$ having the specific slope R1 according to the specific backlight duty. The second means 424 may be configured for performing step 320 to determine the first luminance value X1 according to the specific slope R1. The third means 426 may be configured for performing step 330 to determine the second luminance value X2, and the fourth means 428 may perform step 340 to determine the lower limit factor R2. Means 422, 424, 426 and 428 cooperate with each other to form the tone mapping function T(x).

In a preferred embodiment, all the units as well as means described in FIG. 4 and FIG. 5 are implemented as logic elements in an ASIC (Application Specific Integrated Circuit). In other embodiments according to the present invention, such units and means described in FIG. 4 and FIG. 5 may also be implemented as software or hardware modules in a DSP (Digital Signal Processing) based system or a microprocessor based system.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for processing a digital image which is to be displayed on a display panel illuminated with a backlight module, the method comprising the steps of:

generating a luminance statistic of said digital image;

determining a specific backlight duty according to said luminance statistic;

setting said backlight module to said specific backlight duty;

forming a tone mapping function according to said specific backlight duty and said luminance statistic; and remapping said digital image by said tone mapping function before said digital image is displayed on said display panel;

wherein luminance value of each pixel in said digital image is encoded with a predetermined bit resolution and said forming of a tone mapping function comprises:

determining a linear upper limit mapping function having a specific slope R1 determined according to said specific backlight duty, said linear upper limit mapping function remapping code value zero to zero;

determining a first luminance value X1 according to said specific slope R1;

determining a second luminance value X2 according to said first luminance value X1 and the maximum code value Cmax in said predetermined bit resolution;

determining a lower limit factor R2 greater than or equal to one, and less than said specific slope R1; and forming said tone mapping function such that said second luminance value X2 is remapped to a specific remapped value (W*R1+(1−W)*R2)*X2, wherein W is a weighting number lying between 0 and 1 which is determined according to said luminance statistic, and wherein any luminance value less than said first luminance value X1 is remapped through said linear upper limit mapping function.

2. The method of claim 1, wherein said tone mapping function is further characterized in that said maximum code value Cmax is remapped to itself.

3. The method of claim 2, wherein said tone mapping function is further characterized in that any luminance value lying between said first luminance value X1 and said second luminance value X2 is remapped through a first linear mapping function defined by a straight line connecting points (X1,R1*X1) and (X2, (W*R1+(1−W)*R2)*X2), and any pixel with a luminance value greater than said second luminance value X2 is remapped through a second linear mapping function defined by another straight line connecting points (X2, (W*R1+(1−W)*R2)*X2) and (Cmax, Cmax).

4. The method of claim 1, wherein said first luminance value X1 is determined such that said first luminance value X1 is remapped to a value less than said maximum code value Cmax through said linear upper limit mapping function.

5. The method of claim 1, wherein said lower limit factor R2 is equal to one.

6. The method of claim 1, wherein said weighting number W substantially equals a ratio of count of pixels with luminance values lying between said first luminance value X1 and said second luminance value X2 to count of pixels with luminance values lying between said first luminance value X1 and said maximum code value Cmax in said digital image.

7. The method of claim 1, wherein said first luminance value X1 and said second luminance value X2 are Cmax/2 and (Cmax+X1)/2 respectively.

8. The method of claim 1, wherein said luminance statistic is a histogram recording occurrence frequencies of all possible luminance values of pixels in said digital image.

9. The method of claim 1, wherein said display panel is a liquid crystal display panel.

10. An apparatus for processing a digital image which is to be displayed on a display panel illuminated with a backlight module, comprising:

an image analysis unit, configured for generating a luminance statistic of said digital image, and determining a specific backlight duty according to said luminance statistic;

a backlight setting unit, capable of setting said backlight module to said specific backlight duty;

a tone mapping function generator, configured for forming a tone mapping function according to said specific backlight duty and said luminance statistic; and a tone remapping unit, configured for remapping said digital image by said tone mapping function before said digital image is displayed on said display panel;

wherein luminance value of each pixel in said digital image is encoded with a predetermined bit resolution, and wherein said tone mapping function generator comprises:

means for determining a linear upper limit mapping function having a specific slope R1 determined according to said specific backlight duty, said linear upper limit mapping function remapping code value zero to zero;

means for determining a first luminance value X1 according to said specific slope R1;

means for determining a second luminance value X2 according to said first luminance value X1 and the maximum code value Cmax in said predetermined bit resolution; and means for determining a lower limit factor R2 greater than or equal to one, and less than said specific slope R1;

wherein said means collectively form said tone mapping function such that said second luminance value X2 is remapped to a specific remapped value (W*R1+(1−W)*R2)*X2, wherein W is a weighting number lying between 0 and 1 which is determined according to said luminance statistic, and wherein any luminance value less than said first luminance value X1 is remapped through said linear upper limit mapping function.

11. The method of claim 10, wherein said tone mapping function is further characterized in that said maximum code value Cmax is remapped to itself.

12. The method of claim 11, wherein said tone mapping function is further characterized in that any luminance value lying between said first luminance value X1 and said second luminance value X2 is remapped through a first linear mapping function defined by a straight line connecting points (X1,R1*X1) and (X2, (W*R1+(1−W)*R2)*X2), and any pixel with a luminance value greater than said second luminance value X2 is remapped through a second linear mapping function defined by another straight line connecting points (X2, (W*R1+(1−W)*R2)*X2) and (Cmax, Cmax).

13. The method of claim 10, wherein said first luminance value X1 is determined such that said first luminance value X1 is remapped to a value less than said maximum code value Cmax through said linear upper limit mapping function.

14. The method of claim 10, wherein said lower limit factor R2 is equal to one.

15. The method of claim 10, wherein said weighting number W substantially equals a ratio of count of pixels with luminance values lying between said first luminance value X1 and said second luminance value X2 to count of pixels with luminance values lying between said first luminance value X1 and said maximum code value Cmax in said digital image.

16. The method of claim 10, wherein said first luminance value X1 and said second luminance value X2 are Cmax/2 and (Cmax+X1)/2 respectively.

17. The method of claim 10, wherein said luminance statistic is a histogram recording occurrence frequencies of all possible luminance values of pixels in said digital image.

18. The method of claim 10, wherein said display panel is a liquid crystal display panel.

* * * * *